(12) United States Patent
Griffin et al.

(10) Patent No.: US 9,934,010 B1
(45) Date of Patent: Apr. 3, 2018

(54) PROGRAMMING IN A MULTIPROCESSOR ENVIRONMENT

(71) Applicant: Mellanox Technologies Ltd., Yokneam (IL)

(72) Inventors: Patrick Robert Griffin, Brookline, MA (US); Walter Lee, Framingham, MA (US); Anant Agarwal, Weston, MA (US); David M. Wentzlaff, Princeton Junction, NJ (US)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 14/675,935

(22) Filed: Apr. 1, 2015

Related U.S. Application Data

(63) Continuation of application No. 11/564,723, filed on Nov. 29, 2006, now Pat. No. 9,009,660.

(60) Provisional application No. 60/740,692, filed on Nov. 29, 2005.

(51) Int. Cl.
*G06F 9/44* (2006.01)
*G06F 9/45* (2006.01)

(52) U.S. Cl.
CPC ............ *G06F 8/445* (2013.01); *G06F 8/30* (2013.01); *G06F 8/314* (2013.01); *G06F 8/41* (2013.01); *G06F 8/427* (2013.01); *G06F 8/437* (2013.01); *G06F 8/447* (2013.01); *G06F 8/451* (2013.01)

(58) Field of Classification Search
None
See application file for complete search history.

(56) References Cited

U.S. PATENT DOCUMENTS

| 5,261,095 | A  | * | 11/1993 | Crawford | ............ | G06F 9/4425 |
|           |    |   |         |          |              | 712/E9.082  |
| 8,001,266 | B1 | * | 8/2011  | Gonzalez | ............ | G06F 15/177 |
|           |    |   |         |          |              | 370/351     |
| 2007/0028223 | A1 | * | 2/2007 | Meijer | ............ | G06F 8/427 |
|           |    |   |         |          |              | 717/140     |

OTHER PUBLICATIONS

Lyonnard Damien, "Automatic Generation of Application-Specific Architectures for Heterogeneous Multiprocessor System-on-Chip", Jun. 2001, ACM.*

* cited by examiner

*Primary Examiner* — Lewis A Bullock, Jr.
*Assistant Examiner* — Mark Gooray
(74) *Attorney, Agent, or Firm* — Fish & Richardson P.C.

(57) ABSTRACT

Programming in a multiprocessor environment includes accepting a program specification that defines a plurality of processing modules and one or more channels for sending data between ports of the modules, mapping each of the processing modules to run on a set of one or more processing engines of a network of interconnected processing engines, and for at least some of the channels, assigning one or more elements of one or more processing engines in the network to the channel for sending data between respective processing modules.

23 Claims, 7 Drawing Sheets

PROGRAMMING IN A MULTIPROCESSOR ENVIRONMENT

CROSS-REFERENCE TO RELATED APPLICATIONS

This application claims the benefit of U.S. Provisional Application No. 60/740,692 filed Nov. 29, 2005, incorporated herein by reference.

BACKGROUND

The invention relates to programming in a multiprocessor environment.

Various programming tools exist for parallelizing serial applications to run in a multiprocessor environment, including multi-core processors, or networks of interconnected computers. Computations performed in a first processor can interact with computations performed in a second processor by exchanging data according to communication protocols that control data transmission over physical communication channels interconnecting the processors. In some cases the communication protocols utilize features provided by the underlying hardware such as memory buffers or circuitry for implementing flow control techniques.

SUMMARY

In one aspect, in general, a method for programming in a multiprocessor environment includes: accepting a program specification that defines a plurality of processing modules and one or more channels for sending data between ports of the modules; mapping each of the processing modules to run on a set of one or more processing engines of a network of interconnected processing engines; and for at least some of the channels, assigning one or more elements of one or more processing engines in the network to the channel for sending data between respective processing modules.

In another aspect, in general, a computer program, stored on a computer-readable medium, for generating instructions to be executed in a network of interconnected processing engines, the computer program comprising instructions for causing a computer system to: accept a program specification that defines a plurality of processing modules and one or more channels for sending data between ports of the modules; map each of the processing modules to run on a set of one or more of the processing engines; and, for at least some of the channels, assign one or more elements of one or more processing engines in the network to the channel for sending data between respective processing modules.

Aspects can include one or more of the following features.

Information is provided for at least one destination processing engine for processing data arriving at the destination processing engine from a first port and data arriving at the destination processing engine from a second port.

At least one of the processing engines is used to execute more than one of the processing modules.

At least one channel between processing modules executing on the same processing engine is assigned memory associated with the processing engine for sending data between respective processing modules.

The one or more elements of one or more processing engines in the network assigned to a channel include one or more of: a buffer within a processing engine for storing data sent over a channel; buffer space in memory within a processing engine for storing data sent over a channel; and buffer space in memory coupled to at least one processing engine for storing data sent over a channel.

The one or more elements of one or more processing engines in the network assigned to a channel include one or more of: switches of processing engines along a route through the network between processing engines of respective processing modules; and ports of processing engines coupled to data paths between processing engines along a route through the network between processing engines of respective processing modules.

Configuration specifying instructions are generated for the processing modules to communicate over the mapped channels.

The configuration specifying instructions are executed on the sets of processing engines on which the processing modules are mapped.

The processing modules and the channels are mapped during runtime.

For each of at least some of the channels, memory resources are selected for providing a buffer for storing data associated with the channel.

Selecting memory resources comprises selecting among: a buffer in a destination processing engine dedicated to storing only data associated with the channel; and a buffer in a destination processing engine for storing data associated with multiple channels.

Selecting memory resources further comprises selecting among a buffer in a destination processing engine; and buffer space in memory external to the destination processing engine.

The buffer space in memory external to the destination processing engine comprises an external memory module coupled to at least one processing engine along a route between processing engines of respective processing modules.

The buffer space in memory external to the destination processing engine comprises memory within at least one processing engine along a route between processing engines of respective processing modules.

The information for the destination processing engine comprises identifiers to distinguish data associated with a first channel from data associated with a second channel.

The identifiers comprise a tag for the first channel for matching received data to a buffer associated with the first channel, and a tag for the second channel for matching received data to a buffer associated with the second channel.

The processing engines match a tag in an incoming packet to a buffer dedicated to storing data associated with the channel identified by the tag.

For at least one channel between a port of a first processing module and a port of a second processing module, the channel is mapped to a queue stored in shared memory accessible to a processing engine of the first processing module and a processing engine of the second processing module.

Space is allocated for storing the queue in the shared memory according to a minimum buffer size indicated in the program specification.

For a channel mapped to a route between a first processing engine and a second processing engine, memory resources are selected for providing a buffer for storing data arriving at the second processing engine.

Memory resources are selected for providing a buffer for storing acknowledgement information arriving at the first processing engine from the second processing engine.

The memory resources comprise: a buffer in the second processing engine for storing data that arrives at the second processing engine while the buffer has available storage space; and memory external to the second processing engine for storing data that arrives at the second processing engine while the buffer does not have available storage space.

Storing data that arrives at the second processing engine while the buffer does not have available storage space comprises causing the processing engine to send the received data and data in the buffer to the external memory.

The second processing engine reads data from the buffer if the buffer is not empty, and from the external memory if the buffer is empty.

The second processing engine reads data from the external memory if the external memory is not empty, and from the buffer if the external memory is empty.

At least one of the channels for sending data from one or more ports of any of multiple sender modules to a port of a receiver module is mapped to routes through the network from respective processing engines of the sender modules to the destination processing engine.

The information for the destination processing engine comprises an identifier to recognize data associated with a channel arriving from the first port and data associated with the channel arriving from the second port.

The identifier comprises a tag for the channel for inserting into packets sent from the first port and into packets sent from the second port.

The identifier comprises a tag for the channel for matching data received from the first port and data received from the second port to a buffer associated with the channel.

At least one of the channels for sending data from one or more ports of any of multiple sender modules to one or more ports of any of multiple receiver modules is mapped to routes through the network from respective processing engines of the sender modules to respective destination processing engines of the receiver modules.

The information for respective destination processing engines comprises an identifier to recognize data associated with a channel arriving from the first port and data associated with the channel arriving from the second port.

The identifier comprises a tag for the channel for inserting into packets sent from the first port and into packets sent from the second port.

The identifier comprises a tag for the channel for matching data received from the first port and data received from the second port to a buffer associated with the channel At least one of the channels for sending data from a port of a sender module to one or more ports of any of multiple receiver modules is mapped to routes through the network from a processing engine of the sender module to respective destination processing engines of the receiver modules.

Aspects can include one or more of the following advantages.

A multiprocessor programming library enables a programmer to write programs that specify processing modules that can communicate with other processing modules using high level functions for sending and receiving data over input and output ports of the modules. The channels for sending data between ports of the modules can be mapped to communication resources of a multiprocessor architecture according to the program specification without requiring a programmer to determine how the resources are to be allocated to different channels. The communication resources can include routes through a network interconnecting the processing engines used to execute the processing modules and buffers (e.g., dedicated hardware buffers or buffer space allocated in memory) for temporarily storing data sent over a channel but not yet read by a receiver module. The resources can be mapped, for example, by a compiler before the processing modules are executed, or by a library of routines that execute at runtime to implement functions for sending and receiving data.

Other features and advantages of the invention will become apparent from the following description, and from the claims.

DESCRIPTION

1 Overview

Figure 1A:
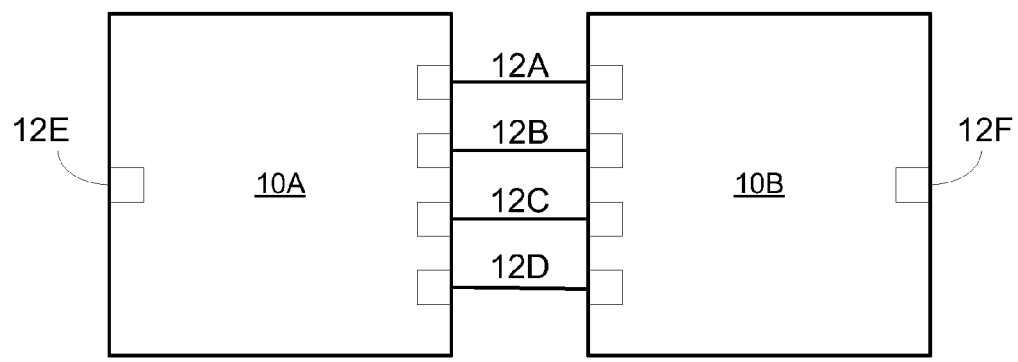
FIG. 1A is a block diagram of processing modules connected by communication channels.

A multiprocessor programming library is used by a user or programmer to specify communications and computations in a multiprocessor environment at a high level. The multiprocessor environment can include a multi-core processor, a field-programmable gate array (FPGA), a digital signal processing (DSP) circuit, or an interconnected network of processors, such as the tiled multiprocessor architecture described in more detail below. The multiprocessor environment provides interconnected processing engines that can be individually programmed using the multiprocessor programming library.

Using the programming library, programs can be expressed as interconnected modules, where communications between the modules are expressed using channels between the modules. The channels provide pipes over which a module can send data (e.g., a single value or a stream of values) to another module. Data can also be multicast from a module to multiple other modules. The specification of a computation performed by a module can be written in a high level language, such as C or C++, Java, or Verilog. The modules can be hierarchical in that a module can contain other modules.

For channels mapped at compile-time, a compiler accepts a program specification that defines processing modules and channels for sending data between ports of the modules. The compiler maps each of the modules to one or more processing engines. For example, an instruction-level parallelizing compiler can map one module to multiple processing engines using instruction-level parallelization. In this example, the compiler generates multiple instances of a module to be mapped to different processing engines from the same module specification. The channels between ports of the modules are mapped onto underlying physical channels interconnecting the processing engines. For example, a channel can be mapped onto a set of inter-tile data paths in the tiled architecture described below. For a function that receives data over a channel that is mapped at compile-time, the compiler can generate instructions to read from the appropriate buffer associated with the channel. For example, if a channel defined at compile-time is allocated a hardware buffer for a physical port at the end of the mapped data path, an instruction can read directly from this buffer.

For channels mapped at runtime, the programming library includes a function for defining channels. In this runtime case, the ports to be connected by a channel may not be known at compile-time, but can be received as arguments to a function. For example, a function that defines a one-way channel between a sender module and a receiver module can accept input arguments that specify a sender module output and a receiver module input port, both of which can be determined and bound at runtime. For a function that receives data over a channel that is mapped at runtime, the compiler implements the function as a library routine that determines at runtime which buffer should be read. For example, if a channel defined at runtime is allocated buffer space in external memory, the library routine determines the address of this buffer space and returns data stored there (e.g., at the head of a queue data structure).

Referring to FIG. 1A, a first processing module 10A includes four data ports for exchanging data with four data ports of a second processing module 10B over four channels 12A, 12B, 12C, and 12D. In some cases the data ports and corresponding channels are unidirectional, and in some cases the data ports and corresponding channels are bidirectional. A compiler maps each of the processing modules to run on a set of one or more processing engines of a network of interconnected processing engines. In this example, the processing engines correspond to tiles of the tiled integrated circuit described in more detail below. The tiles are indexed according to an (x,y) coordinate system.

Figure 1B:
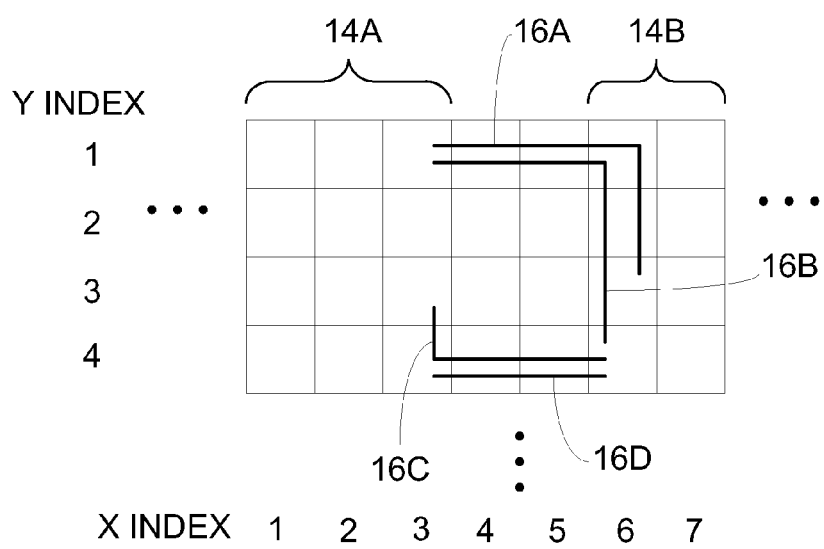
FIG. 1B is a schematic diagram of the processing modules and channels of FIG. 1A mapped onto a multiprocessor circuit.

Referring to FIG. 1B, the first processing module 10A is mapped to a set of twelve tiles 14A indexed (1,1) to (3,4). The second processing module 10B is mapped to a set of eight tiles 14B indexed (6,1) to (7,4). The compiler maps communication channels to a route through the network between a tile of the first processing module 10A and a tile of the second communication module 10B. Multiple channels can be mapped to overlapping, or even the same, routes through the network. For example, the first channel 12A is mapped along the route 16A between tile (3,1) and tile (6,3). The second channel 12B is mapped along the route 16B between tile (3,1) and tile (6,4). The third channel 12C is mapped along the route 16C between tile (3,3) and tile (6,4). The fourth channel 12D is mapped along the route 16D between tile (3,4) and tile (6,4).

For tiles serving as an endpoint for multiple channels, such as tile (6,4), an identifier can be provided to distinguish data arriving at the destination associated with a first channel from data arriving at the destination associated with a second channel. If multiple channels are mapped to the same input to a tile, then the compiler can use these identifiers to sort data from different channels to be received into different registers or input queues. To facilitate the de-multiplexing at the receive side, the sending tile (according to an instruction generated by the compiler) sends a tag along with the data that is sent. Note that the tag is distinct from the address header that is applied on the message. The tag is inspected by the receive side hardware to sort the incoming data to one of several queues. For example, the "receive side de-multiplexing" described in U.S. application Ser. No. 11/313,900 (e.g., in section 4.4.2), incorporated herein by reference, can be used to sort data for different channels. The receive side instructions can read data from a channel by reading one of a few dedicated de-multiplexing buffers. The tag associated with a given buffer can change. For example, in different phases of a program, different channels can be mapped to be read by the receiving module from the same de-multiplexing buffer.

Either the dynamic network or the static network in the tiled integrated circuit described below can be used route data for a channel, for example. Depending on the physical network resources used, the route may be determined according to different protocols. For example, when a channel is mapped to a route through the dynamic network physical links, the route is determined according to a dimension-ordered routing protocol in which data is routed first in an x dimension and then in a y dimension, as shown for channels 16A, 16B, and 16D (FIG. 1B). When a channel is mapped to a route through the static network physical links, the route is determined according to predetermined switch instructions, as shown for channel 16C, which does not follow the same dimension-ordered protocol. A channel can also be "hard wired" between tiles using the "single instruction mode" described below.

The compiler is also able to map some channels to a queue stored in shared memory accessible to both processing modules, so that inter-module communication occurs through shared memory access. This shared memory mechanism allows multiple modules (or the whole program) to be mapped to a single tile, or a number of tiles that is fewer than the number of modules in the program. Shared memory mechanisms enable a programmer to share data between modules or within a module.

The compilation process generates compiled code for each of the processing modules, and configuration data (e.g., an executable "static compilation unit" described in more detail below) specifying instructions for the processing modules to communicate over the mapped channels.

Pattern matching programs (e.g., for deep packet inspection), or video encoder/decoder programs (e.g., implementing MPEG2 or H.264) are examples of programs can be implemented from modules built using the multiprocessor programming library. In deep packet inspection, a module is created for the load balancer. A module is also created for the deep packet inspector (DPI). If the user desires 10 DPI modules, then the user does not have to replicate the code for 10 tiles, rather the user can instantiate multiple instances of the same module. A unique attribute can be created for each instantiation by giving each of them an ID. For communication between the load balancer and the DPI module (e.g., to send packet header information or an ID representing a packet), a channel can be used. For communicating packet data for inspection to a module, shared memory can be used. A channel can also be used to couple the program to a host operating system such as Linux. To do so, the host operating system has an interface call to a channel.

2 Tiled Circuit Architecture

A tiled circuit architecture is an example of a multiprocessor environment for which the multiprocessor programming library can provide a powerful programming interface for a programmer to take advantage of various hardware resources. Referring to FIG. 1, an integrated circuit 100 (or "chip") includes an array 101 of interconnected tiles 102. Each of the tiles 102 is a functional unit that includes a processor and a switch that forwards data from other tiles to the processor and to switches of other tiles over data paths 104. The switch is coupled to the processor so that data can be sent to or received from processors of other tiles. The integrated circuit 100 includes other on-chip circuitry such as input/output (I/O) interface circuitry to couple data in and out of the circuit 100, and clock distribution circuitry to provide clock signals to the processors of the tiles.

The integrated circuit 100 shown in FIG. 1 includes a two-dimensional array 101 of rectangular tiles with data paths 104 between neighboring tiles to form a mesh network. The data path 104 between any two tiles can include multiple wires to support parallel channels in each direction. Optionally, specific sets of wires between two tiles can be dedicated to specific mesh networks that can operate independently. Alternative network configurations include networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented off-chip or in logic blocks within a tile or on the periphery of the integrated circuit 100.

The following exemplary implementations are described in the context of tiles that have the same structure and functionality. Alternatively there can be multiple "tile types" each having different structure and/or functionality. For example, tiles that couple data off of the integrated circuit 100 can include additional circuitry for I/O functions.

Figure 2:
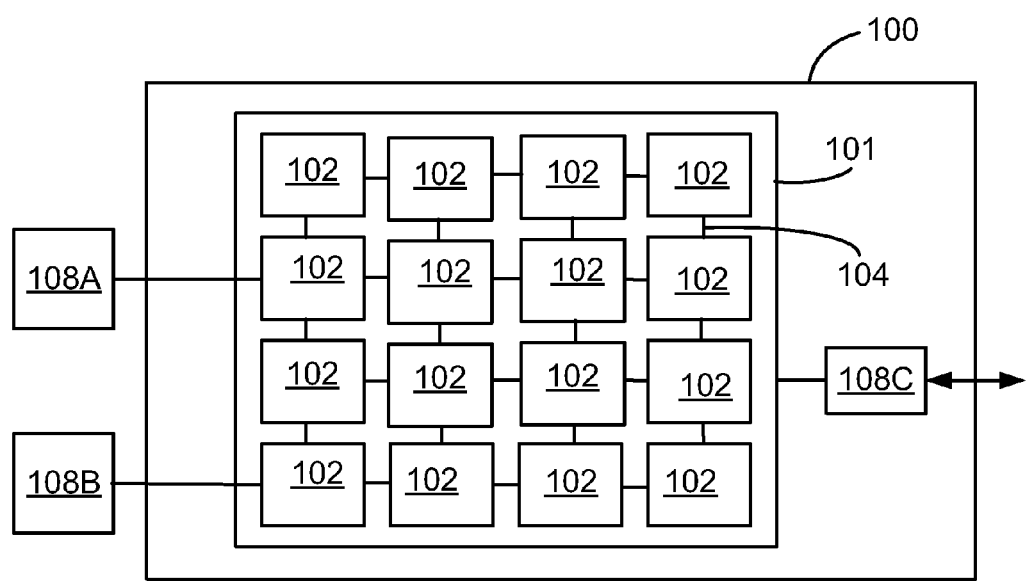
FIG. 2 is a block diagram of a tiled integrated circuit.

Referring to FIG. 2, a tile 102 includes a processor 200, a switch 220, and sets of incoming wires 104A and outgoing wires 104B that form the data paths 104 (or "links") for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can be multithreaded and have capabilities of a Very Long Instruction Word (VLIW) processor. The processor 200 can include other types of functional units such as a multiply accumulate unit, or a vector unit.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which a unit of data (a "word") traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

2.1 Switch Operation

A tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "sub-instruction" for each output port indicating to which input port it should be connected. In other implementations, the processor 200 receives a stream of compound instructions with a first instruction for execution in the pipeline 208 and a second instruction for controlling the switching circuitry 224.

In either case, these switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on header information in the data being dynamically routed. A tile can send a packet to any other tile by generating the appropriate address information in the packet header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network packets can have a fixed length, or variable length that is indicated in the header information. Alternatively, a predetermined tag can indicate the end of a variable length message. Variable length messages reduce fragmentation. The payload of a packet includes a message or a portion of a message that is delivered to the tile at the destination address.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should direct data to a processor input buffer providing data to a pipeline stage or from a processor output buffer receiving data from a selected register or bypass path of the pipeline 208 (e.g., using a multiplexer). Any stage of the pipeline 208 can pull data from any input buffer 222 of the static or dynamic network (e.g., by mapping the input buffers 222 into a register file name space). This pipeline integration allows data to be available to the switch 200 the moment an instruction is executed and the register value is available. In the next cycle the same data could appear at an input buffer of another tile.

Figure 3:
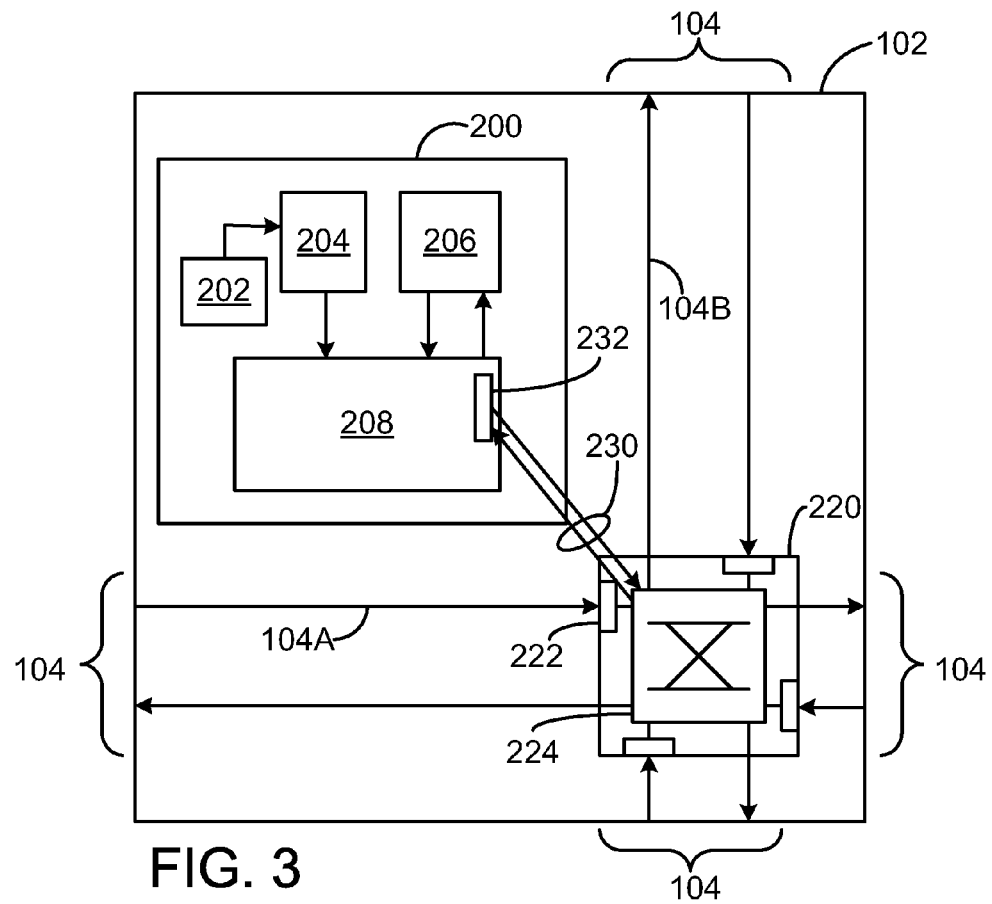
FIG. 3 is a block diagram of a tile.
Figure 4A:
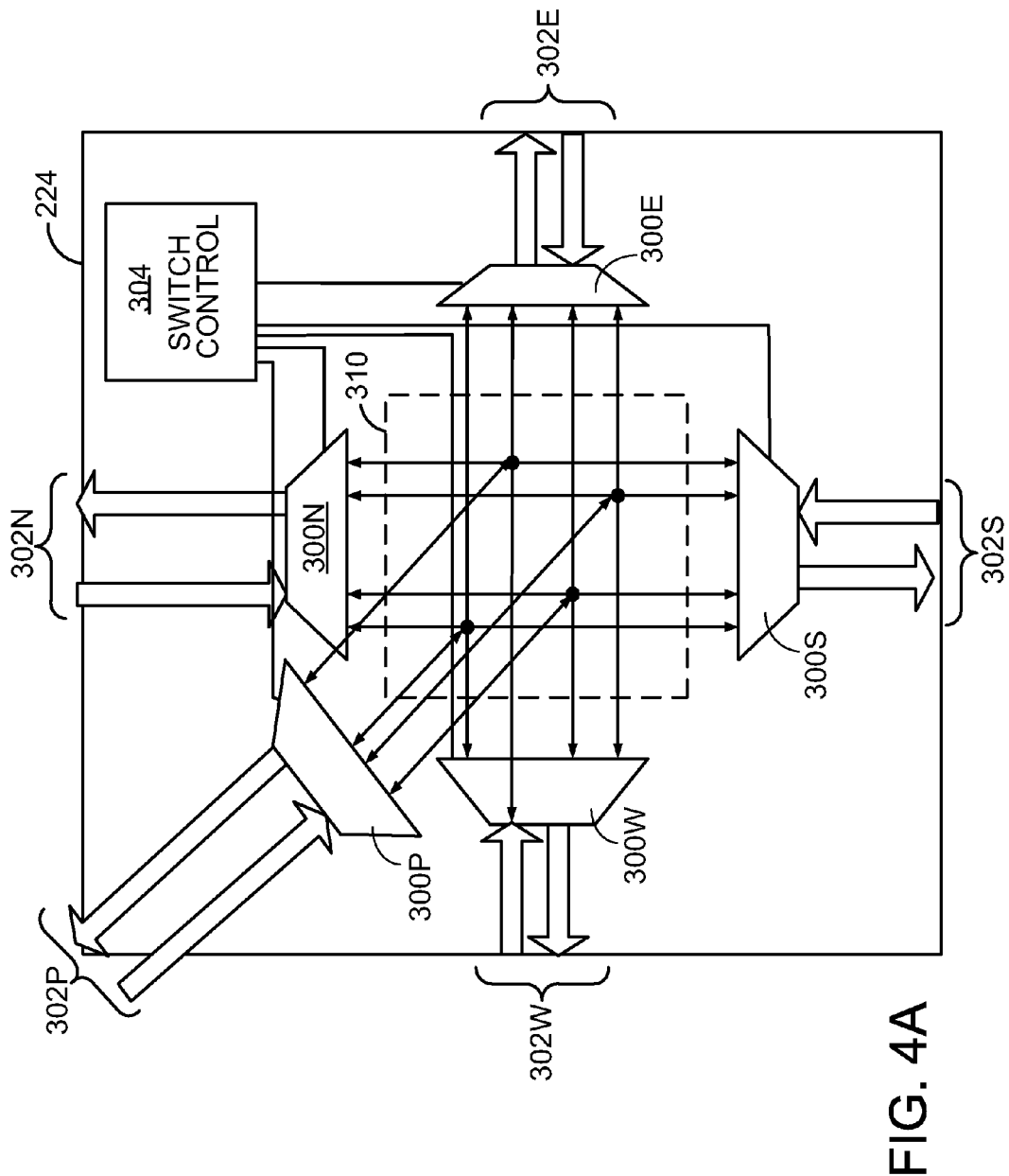
FIGS. 4A, 4B and 4C are diagrams of switching circuitry.
Figure 4B:
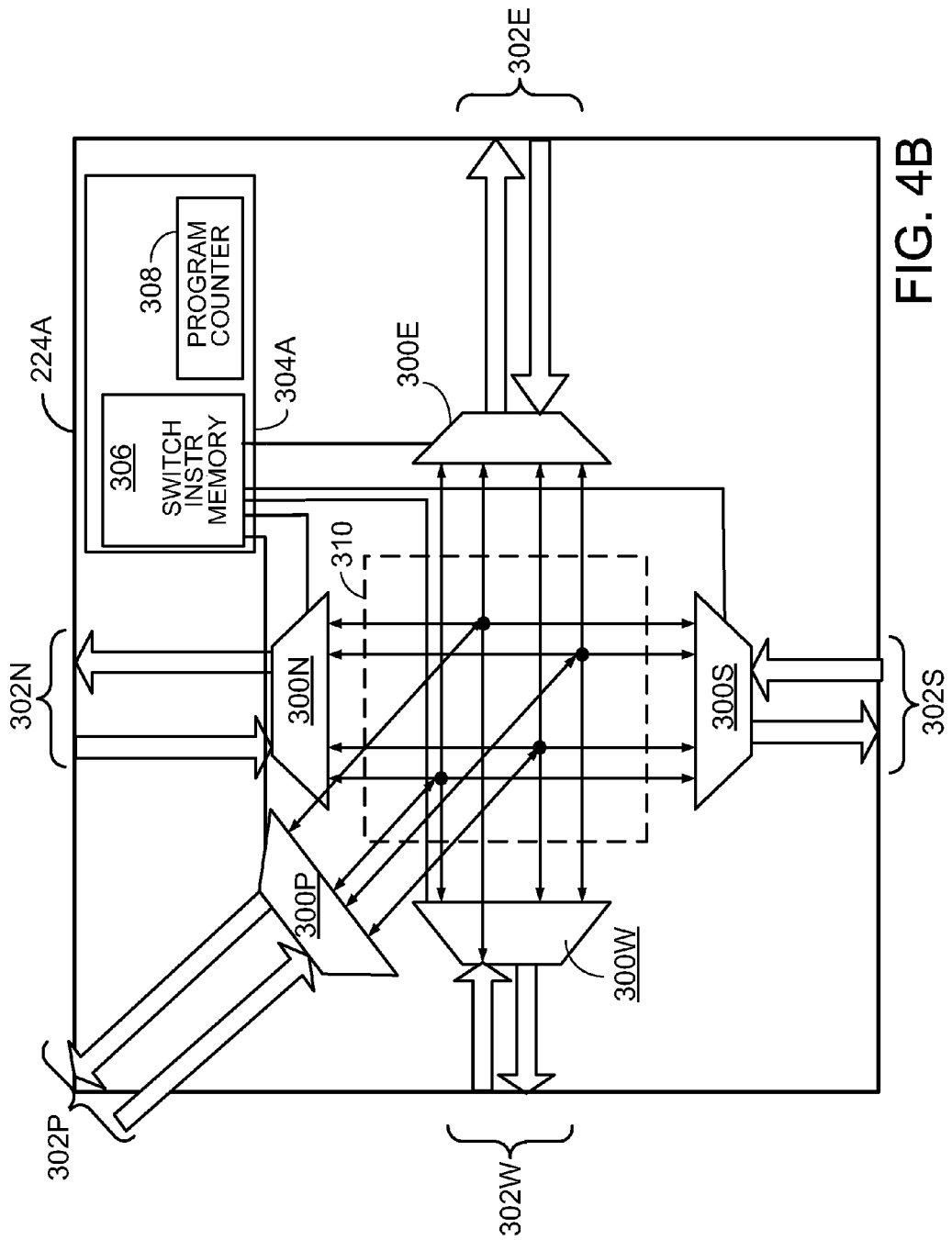
Figure 4C:
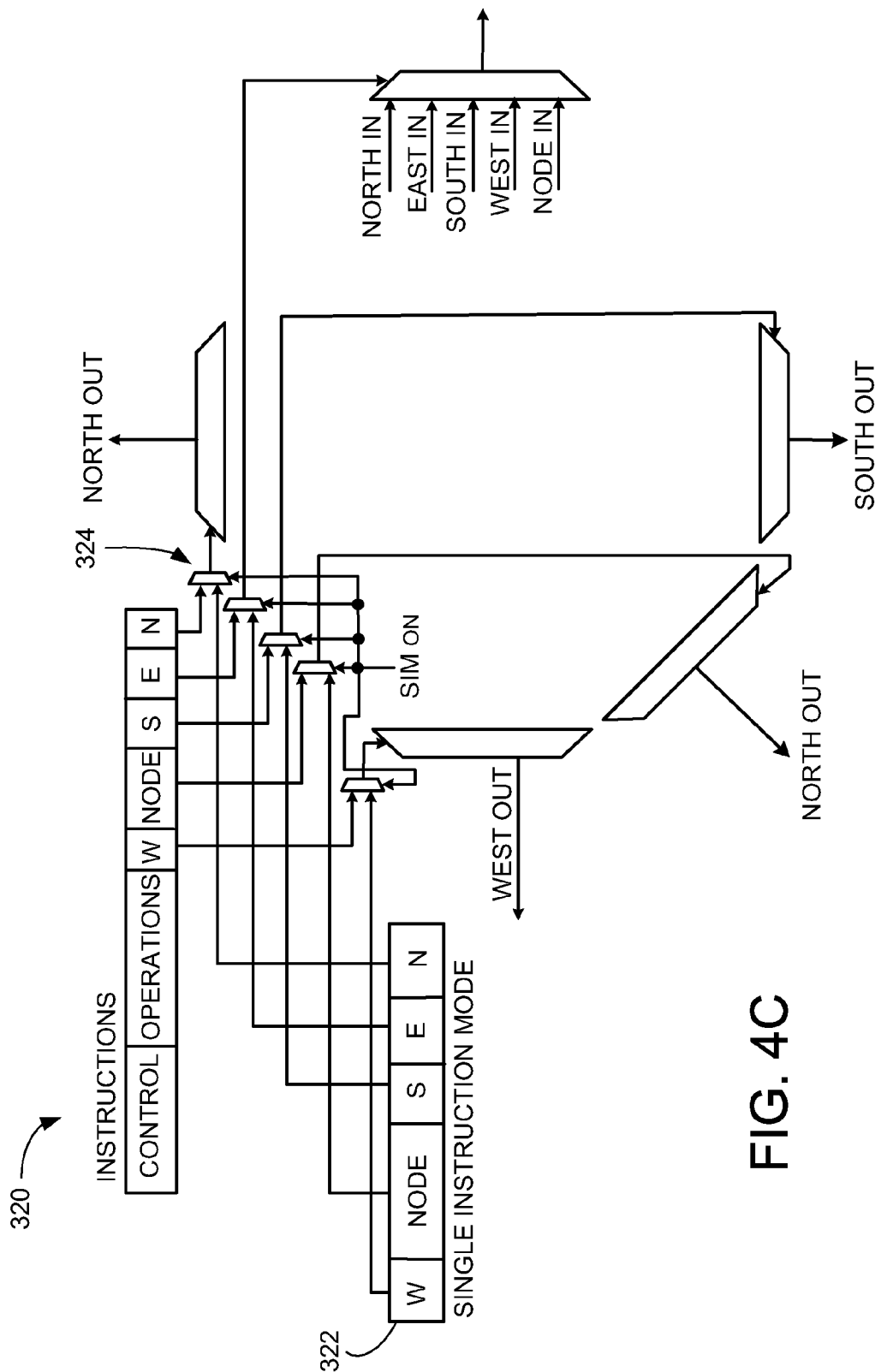

Referring to FIG. 3A, switching circuitry 224A includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A control module 304 selects which input port and output port are connected in a given cycle. The routing performed by the control module 304 depends on whether the switching circuitry 224 is part of the dynamic network or static network. For the dynamic network, the control module 304 includes circuitry for determining which input and output ports should be connected based on header information in the incoming data.

Referring to FIG. 3B, for the static network, the control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the control module 304A can enable the multiplexers to move data independently onto any output port from any input port, including multicasting an input port to all output ports, as long as two input ports are not connected to the same output port in the same clock cycle.

The control module 304A is able to function as a switch processor with or without an ALU and registers. The control module 304A can include an ALU and registers to allow in-switch processing of in-flight messages. Optionally, the control module 304A can include other components such as a floating point arithmetic unit, or bit shifter, for example, to perform additional functions. The control module 304A can also be VLIW-type processor and be multithreaded.

Referring to FIG. 3C, a static network switch 320 is configured in "single instruction mode." In single instruction mode, one instruction is being used and this instruction is hard wired to control the multiplexers of the switch. When data arrives at one switch input port, that data is routed according to the instruction stored in the single instruction buffer 322 independent of the availability of data a the other switch input ports. In this example, the switch 320 includes multiplexers 324 for turning single instruction mode on or off.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer, or send data to a tile with a full input buffer 222 or to a full processor input buffer. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

2.2 Additional Circuitry

A tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

3 Multiprocessor Programming

A software system for a multiprocessor environment such as the tiled integrated circuit 100 includes a multi-phase compiler system that allows applications to be built from "module programs." The module programs can define ports that can be connected by channels for communicating data among the module programs. For example, in a data processing application, each module program can implement a processing module that performs a different data processing task, and data can pass among the module programs over the channels.

Figure 5:
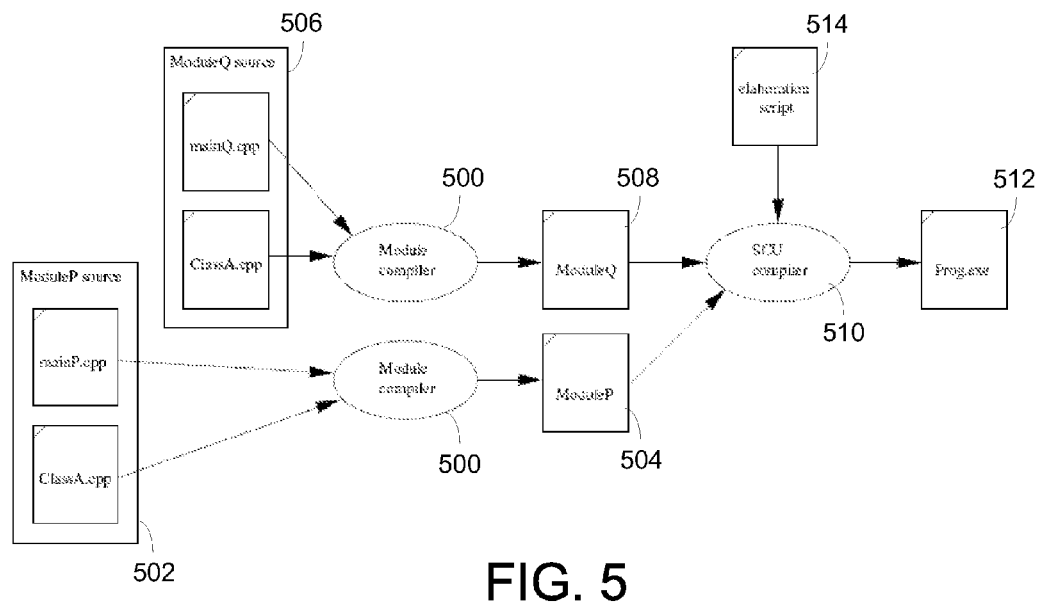
FIG. 5 is a block diagram of a compiling process.

The multi-phase compiler system enables inter-module static analysis while still allowing dynamic program behavior. Referring to FIG. 5, in a first phase, a module compiler 500 compiles source code 502 to generate a module program 504 labeled ModuleP, and compiles source code 506 to generate a module program 508 labeled ModuleQ. The source code can include any number of source code files including an entry pont (e.g., main( ) functions defined in mainP.cpp and mainQ.cpp). Different programs may have some source code files in common (e.g., classA.cpp). The module compiler 500 parses high-level code such as C or C++ and performs syntax and type-checking.

In a second phase, an SCU compiler 510 generates an executable program 512 from the module programs 504 and 508 according to an elaboration script 514. The SCU compiler 510 maps one or more module programs to respective sets of one or more tiles. In some cases a module program may map to multiple tiles, and in some cases, multiple module programs may map to the same tile. The executable program 512, called a "statically compiled unit" (SCU), includes the instructions to be executed on the respective sets of tiles on which the module programs are mapped.

The elaboration script 514, provided by the programmer, defines channels for connecting various modules into a desired application. The elaboration script 514 defines any number of instances of a given module program 504 and defines the channels between ports defined by the module programs. Thus, the elaboration script can define an application as a graph of interconnected modules. Module ports that are not connected to a channel can provide an external input or output interface for the SCU 512. External interface ports of one SCU can be connected to external interface ports of another SCU at execution time using dynamically assigned channels.

The elaboration script 514 can specify or suggest a mapping of the module programs to tiles. Alternatively, if no tiles are specified, the SCU compiler 510 can determine an appropriate allocation of the available tiles to module programs. For example, a particularly large or complex module program may be automatically parallelized onto multiple tiles.

The multiprocessor programming library provides an application programming interface (API) for the module programs and the elaboration script 514. The library includes functions to provide channels among module programs, and functions for implementing features such as multithreaded processing, and memory management. A channel library includes functions for different types of channels that can be specified in an elaboration script. The SCU compiler 510 can determine the resources to be used to implement each channel depending on the type of the channel defined in the elaboration script. For example, shared memory can be allocated for "shared memory" channels and static or dynamic network resources are provided for "streaming" channels. For a shared memory channel, network resources may be used to send data to and from a coupled memory module, or if two module programs are mapped to the same tile, a portion of the data memory on the tile may be allocated for the channel.

The channel library includes functions for defining ports of a module in a module program, and functions for defining a channel between ports of different modules in an elaboration script. A programmer can instantiate multiple instances of a module program in the elaboration script. Data written to a port of one module program is communicated using the resources allocated for the defined channel and is read by a port in a different module. The channel library, in conjunction with the SCU compiler 510, allows the programmer to access the communication resources of the tiled circuit without needing to explicitly define placement of modules on tiles, routing of data among tiles, or scheduling of data transfer.

The receive side de-multiplexing circuitry, for example as described in U.S. application Ser. No. 11/313,900, can be used at the receiving tile to separate packets associated with different dynamic network channels. This de-multiplexing circuitry can also be used to process traffic according to priority. For example, some channels for high priority traffic can be de-multiplexed to buffers for storing packets tagged for respective channels, and channels for lower priority traffic may share a catch-all buffer that is de-multiplexed in software.

A channel can also be implemented over the static network. The static network enables the compiler to reserve a path through the network between two tiles. The links can be reserved to carry data associated with a predetermined static network channel between tiles of two modules. Thus, in this case there is no need to de-multiplex traffic from other channels.

Figure 6:
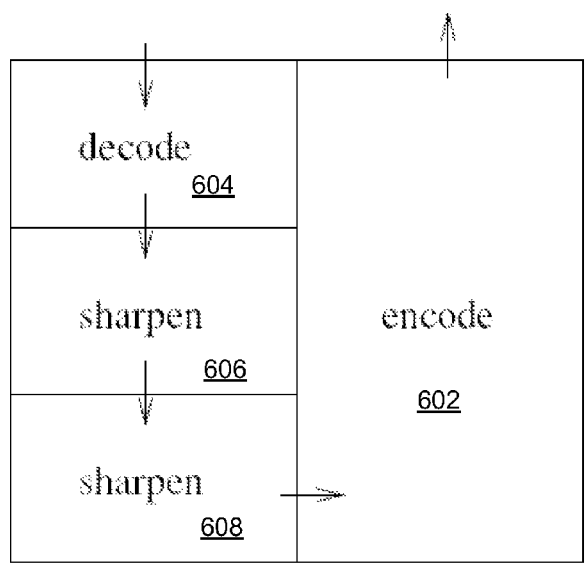
FIG. 6 is a block diagram of connected modules of a statically compiled unit.

FIG. 6 shows an SCU 600 containing four module program instances: one encoder module 602, one decoder module 604, and two instances of a sharpening module 606 and 608. The decoder module 604 has its output port connected via a channel to the input of the first sharpening module 606. The first sharpening module 606 then connects to the second sharpening module 608, which connects to the encoder module 602. This SCU 600 has two external interface ports—one at an input port of the decoder module 604, and one at an output port of the encoder module 602. To compile this program 600, an application developer can first use the module compiler 500 to separately compile the three module programs defining the encoder module, decoder module, and sharpening modules, and can then use an elaboration script to generate the executable program 600 with the SCU compiler 510.

An application may be composed of multiple SCUs loaded at runtime. The multiprocessor programming library provides an interface by which an SCU may request that some other SCU be loaded and executed on a separate set of tiles. Channels can be assigned between separately loaded SCUs, but messaging performance between the two SCUs may be lower than between modules within an SCU.

The module compiler 500 is able to schedule instructions in both time and space by generating both processor and switch instructions for arranging the static network. The combination of the static network and the pipeline integration enables the module compiler 500 to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can be a Linux like kernel or a similar kernel running on a single tile 102. Alternatively, the OS can be a distributed OS running on multiple tiles sending messages to each of the processes on each of the tiles.

The module compiler 500 can leverage the architectural features of the integrated circuit 100 by partitioning and scheduling ILP or data-level parallelism across the tiles. The module compiler 500 is able to automatically parallelize sequential applications across multiple tiles 102. For example, outer loops can be parallelized at a coarse-grained while inner loops can be parallelized at a fine grain, much as in a vectorizing compiler. When the module compiler 500 can identify commonly occurring instruction patterns or bit operations, they can be configured into special operations that will run in a single cycle using the reconfigurable logic.

The software system including the multiprocessor programming library and the compilers and runtime routines for implementing the library functions can be provided as computer programs, stored on a computer-readable medium.

4 Multiprocessor Programming Library

The multiprocessor programming library provides an API for several sets of tasks: channel communication, dynamic messaging, threading, shared memory, and SCU management. The channel library allows each module to send and receive data from statically created ports. Dynamic messaging allows messages to be sent to arbitrary recipients at runtime. Threading allows a module to time-share its resources among multiple threads of computation. Functions for allocating shared memory provide memory regions that are visible to multiple modules. Threads associated with a particular module can automatically share the same memory space. SCU management functions enable the set of currently executing SCUs and channels to be modified at runtime.

4.1 Channel Communication

The channel library supports several different communication topologies. These topologies provide a set of messaging primitives from which more complicated messaging patterns can be built, for example, by using sets of multiple channels. Different channel topologies provide unidirectional or bidirectional communication among three basic types of ports: input ports that receive data, output ports that send data, and input/output (i/o) ports that are able to both send and receive data. A module program can define any number of ports for receiving or sending data over a channel.

The basic channel topologies include: (1) a "channel" that provides one-way communication from an output port of one module to an input port of another module; (2) a "bichannel" that provides two-way communication between an i/o port of one module and an i/o port of another module; (3) a "broadcast channel" that provides one-way communication from an output port of one module to input ports of multiple modules; (4) a "bus" that provides communication from any one of multiple i/o ports connected to the bus to each of the other i/o ports connected to the bus; and (5) a "sink channel" that provides one-way communication from any of multiple output ports connected to the sink channel to one input port connected to the sink channel.

The channel and bichannel topologies provide simple point-to-point messaging. A wide range of network topologies can be assembled from these basic primitives. In addition, the library also offers a number of multicast topologies for improved efficiency. A bus channel enables any module in a group to send a multicast message to every other module in the group. A broadcast channel allows one module to send a single message to some arbitrarily large group of recipient modules, and a sink allows any module in a group of potential senders to send a message to a particular recipient module. While it is possible for a module to receive data from multiple modules over separate respective point-to-point channels or bichannels, the sink channel enables a programmer to more efficiently check for incoming data. For example, a module does not need to check for available incoming data on each of multiple input ports receiving data from respective modules, but can instead check for data on a single input port that combines incoming data from the multiple modules.

When a packet of data is to be sent over a channel from a sender module to a receiver module, the sender module performs a "send" operation identifying the data to be sent over a channel from a given output or i/o port. The receiver module performs a "receive" operation for the input or i/o port connected via the channel. Using these send and receive operations, when data arrives at an input port from multiple potential senders, the ordering of respective data packets from a given sender is preserved, but not necessarily from different senders. Packets from a given sender are received at a receiving input or i/o port end of a channel in the same order in which they were sent from an output or i/o port end of the channel. Packets from different senders (e.g., in a sink channel or a bus) may be interleaved at the receiving port.

In some cases, a programmer may want multiple units of data to be sent from a sender to a receiver without any interleaved messages from other senders. For example, the programmer may want to send a data header followed by some variable amount of data. To prevent such interleaving, the channel library provides a "bundled send" operation. When a series of bundled send operations is defined as a group of operations, the respective data units identified by each of the bundled send operations are sent over a channel as an uninterruptible stream of data so that undesired interleaving can be avoided. The receiver module reads the data units using a corresponding number of respective receive operations.

A sink channel can be implemented in a variety of ways. In a first approach, in which channels are implemented over the dynamic network, the SCU compiler generates instructions that perform send operations from respective sender ports, and each send operation sends packets over a network path to the same receiver port that is identified by a tag in the packet. The tag identifies a de-multiplexing queue that is to store packets of data for the sink channel. The packets from different sender ports are interleaved in the queue in the order in which the packets arrived. The receive operations generated by the SCU compiler for the receiver port read the data from the queue.

In a second approach, data from each sender port can be stored in the same data structure (e.g., a linked list) in memory. If the data structure is allocated in shared memory, the sender module can store data directly to the allocated data structure. Alternatively, the data can be sent as packets that include the same tag identifying the data structure, and the receiver module can store the data to the data structure according to the tag. The receive operations generated by the SCU compiler for the receiver port can read packets from the data structure in the order in which the packets arrived.

In a third approach, data from different sender ports are stored in different data structures. If the data structures are allocated in shared memory, the sender module can store data directly to a corresponding allocated data structure. Alternatively, the data can be sent as packets that identify a respective data structure for each sender port, and the receiver module can store the data to the corresponding data structure. The receive operations generated by the SCU compiler for the receiver port identify the set of data structures corresponding to the sender ports and select the next data structure to be read (e.g., the next non-empty data structure in a round-robin order).

The first and second approaches enable an efficient receive operation due to the implicit interleaving of received data. The second approach may include managing the shared data structure to ensure that there is enough storage space for data from each of the sender ports. The third approach enables efficient management of the individual data structures since each data structure is allocated storage space dedicated to a respective sender port.

Similarly, each receiver port in a bus can be implemented in a variety of ways, as described herein, using tags and/or shared memory data structures to receive data from different potential sender ports.

4.2 Dynamic Messaging

Some applications may use communication that is infrequent and/or addressed to a receiver that is not necessarily known before runtime. In such applications, it may not be efficient for the programmer to declare in an elaboration script a set of channels and ports for every possible message that may be sent between modules.

The channel library supports functions for defining channels at runtime. The SCU compiler implements these functions using routines that perform functionality similar to the SCU compiler in allocating resources for the channels, but the allocation and channel setup can be performed at runtime (e.g., if specific ports to be used are not known at compile-time). The routines for runtime resource allocation may also be invoked directly by a user.

The channel library also supports a runtime message passing interface. Using the runtime message passing interface provides increased flexibility in exchange for some degradation in performance compared to communicating over channels defined at compile-time or channels defined at runtime. The flexibility gained by the runtime message passing interface may make it a sensible design choice for infrequent, unordered, low-bandwidth messages like initialization commands.

The runtime messaging passing interface is based on module identification labels ("module IDs"). Any module can send a message to a given module by addressing the message to the module ID assigned to that module. There is no limit to message length, provided that the application has provided enough buffering associated with the receiver module to store the incoming message. The receiver module can allocate a temporary buffer for storing incoming messages with an overflow error being triggered if the temporary buffer overflows. The programmer can use a function in a receiver module program to obtain a module ID at runtime and distribute that module ID to other modules, for example, using a broadcast message.

After a module ID for a given receiver module has been obtained by a sender module, the receiver module can look for and receive a message from the sender addressed to its module ID using "msg_poll" and "msg_receive" functions. The msg_poll function indicates whether a message has arrived. The arguments to the msg_receive function are a buffer and the amount of data to be written into the buffer. The msg_receive function is able to block further actions in the module until the indicated amount of data has been received and stored in the buffer.

The sender module, after obtaining the appropriate module ID, can send data addressed to that module ID. The programmer can use a "msg_send" function in the sender module program to send a packet of data. If two modules might send a message to the same recipient, there should be enough space in the buffer for both messages. In order to guarantee the availability of buffer space, the modules can use an acknowledgement-based protocol to inform the sender that its message has been received and/or dequeued from the buffer by the receiver.

4.3 Threading

The multiprocessor programming library includes a threading library for time-multiplexing separate computation threads on the same set of module resources (e.g., the same set of tiles on which a module is implemented). Resources are allocated on a per-module basis, and the allocated resources are used by the currently executing thread. Thus, if a module is allocated four tiles, its program instructions will be parallelized by the module compiler across all four tiles. When a context switch occurs, all four tiles will switch to the new thread. This approach allows threads to operate as a latency-hiding mechanism. For example, if one thread stalls on a disk access, another thread may be swapped in to make better use of tile resources.

The module programs also provide a form of space-multiplexing of computation threads. Multiple instances of a module program can implement multiple threads of a computation running concurrently on different sets of tiles.

4.4 Shared Memory

The multiprocessor programming library includes a shared memory library. Programmers may wish multiple modules (including multiple instances of the same module program) or multiple threads within a module to share the same memory space. The shared memory library includes functions for shared data allocation and functions for lock management. Shared memory applications, for example, can allocate memory space for storing data in a memory region to be shared among many modules, and can control access to that data with locks.

Shared data is supported using shared memory allocation functions. By using these memory allocation functions, the programmer can create data objects to be stored in a memory region shared among all the application's modules and SCUs. A data object allocated in shared memory may be deleted by any module in the application.

The shared memory library also includes functions to manage "locks" to control access to shared data. A set of mutual exclusion (or "mutex") functions enable locking and unlocking operations and other management operations.

4.5 SCU Management

The multiprocessor programming library includes other functions that can be used to manage execution of SCUs at runtime. In the two-phase compiling process, source code for individual module programs are compiled into modules programs, and instances of module programs are compiled into an SCU via an elaboration script describing resource allocation and inter-module channel connections. The SCU may be executed in a multiprocessor environment such as the tiled integrated circuit. Some particularly dynamic applications may demand the ability to swap out code at runtime. For example, a multimedia application may swap out a MPEG-2 decoder and replace it with an MPEG-4 decoder. The multiprocessor programming library supports such requirements by allowing runtime management of SCUs. One SCU can initiate the addition and/or removal of other SCUs and connection of the SCUs with channels as needed.

The SCU management functions enable two sets of mechanisms. The first allows SCUs to be removed from or added to an application's currently executing set of SCUs. The second allows the application to create channels between external interface ports on any executing SCU. An SCU's external interface ports are module ports that are not connected by any internal channel by an elaboration script, such that they are free to be connected to ports in other (external) SCUs at runtime. Thus, to swap out video decoders, the application would remove an SCU with the MPEG-2 decoder, add an SCU with the MPEG-4 decoder, and connect the new ecoder's external ports to appropriate ports in other SCUs.

Figure 7:
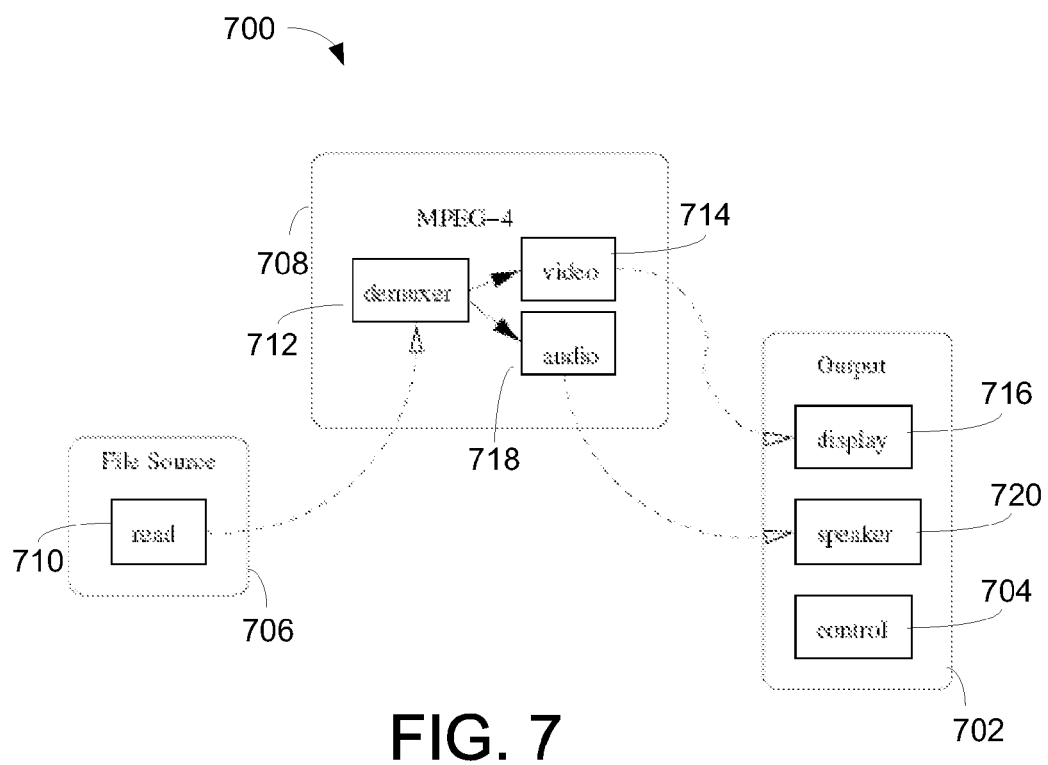
FIG. 7 is a block diagram of connected statically compiled units of an application.

For example, FIG. 7 shows an application 700 that includes three SCUs. At startup of the application 700, an Output SCU 702 is executed. During runtime, a control module 704 within the Output SCU 702 determines that it needs to read from a file and decode the resulting data stream using an MPEG-4 decoder. The control module 704 then adds a File Source SCU 706 and an MPEG-4 SCU 708. The control module 704 also forms inter-SCU channels to connect each SCU's external port interfaces appropriately. A file reader module 710 in the File Source SCU 706 feeds the data stream to a demuxer module 712 in the MPEG-4 SCU 708. A video module 714 connected by an internal (statically compiled) channel to the demuxer module 712 feeds a video stream to a display module 716 in the Output SCU 702. An audio module 718 connected by an internal channel to the demuxer module 712 feeds an audio stream to a speaker module 720 in the Output SCU 702. If, at some point during execution, the application 700 needs to read a different type of video stream, the control module 704 can remove the MPEG-4 SCU 708 and replace it with some other decoder that has a similar external port interface.

4.6 Elaboration Script

During the second compilation phase (the "elaboration phase") the SCU compiler combines modules indicated in the elaboration script to form an SCU. Separating the code in the elaboration script from the code for the individual modules facilitates code reuse by adding a level of indirection to communication primitives. The send and receive operations in a module program operate on ports, and channels connecting ports are declared in the elaboration phase. Consequently, module programs can be coded with only a specification of input, output, and i/o ports, and the elaboration phase can determine the connections between modules without requiring any changes in the module programs' source code.

Using the elaboration phase to combine module programs into an SCU allows extensive optimization of scheduling and resource allocation. For example, compiling multiple modules into an SCU enables optimized communication over the static network resources of the tiled integrated circuit described herein. Combining a set of modules into an SCU is functionally equivalent to spawning each module in an individual SCU at runtime and connecting them with dynamic channels at runtime, but combining the modules at compile-time in the elaboration phase will generally lead to a higher-performance application.

Functions that can be used in an elaboration script include: "instance," "channel," "hint," and "require." The "instance" function specifies a module program from which an instance of a module will be generated for inclusion in an SCU. The "channel" function takes as arguments a channel name, a minimum buffer size, a list of sending module/port pairs, a list of receiving module/port pairs, and an indication of whether the channel topology is channel, bichannel, broadcast channel, bus, or sink channel. The "hint" and "require" functions inform the SCU compiler that a module instance should or must have a certain property, respectively. Possible properties include "location" (e.g., identified by x and y tile coordinates) and "lockable." The elaboration script can also place constraints on the layout and resource allocation of the compiled code. For example, elaboration hints might be used to constrain a given module to a 3×4 set of tiles or to suggest the number of tiles used by a given module. By using hint and require functions, the programmer should be able to indicate that SCUs should fit a particular tile geometry, making it easier to swap SCUs in and out at runtime if necessary.

Any of a variety of scripting tools may assist in the programmer in creation of an elaboration script. For example, a graphical module layout tool can process a graphical representation of the module instances and interconnections and generate the elaboration script before the SCU compiler is run.

5 Managing Hardware Resources

To describe how channels can be mapped to hardware communication resources in a multiprocessor environment, various examples are presented in the context of the tiled integrated circuit architecture described herein, and in U.S. application Ser. No. 11/313,900, incorporated herein by reference. Depending on the type of channel to be implemented, the SCU compiler generates the appropriate instructions for execution in a given architecture so that each channel is able to use adequate hardware resources, such as memory to provide dedicated buffer space or communication bandwidth to provide dedicated return channels, as described in more detail below.

Each channel type implements a set of channel library functions using the allocated hardware resources. Some functions are directed to transferring data into and out of a channel. Some functions are directed to testing characteristics of a channel such as status of an associated buffer for holding data that has been written into the channel but not yet read out of the channel. For example, a basic set of functions implemented by each channel type includes: send( ), blocked( ), receive( ) available( ) and drain( ) functions.

The send( ) function is used in a module with an output port (or i/o port) to write data into a channel connected to that port. A corresponding send( ) operation executed in a tile stalls if the channel has run out of buffer space. Each channel type uses an appropriate mechanism to provide this form of reverse flow control or "back-pressure" to prevent situations that could result in deadlock, as described in more detail below. Some channel types use a "side channel" to transfer reverse flow control information back from the receiving module to the sender. This side channel is managed so that it does not to exceed a small predetermined amount of buffering. Consequently, side channels do not need reverse flow control, and therefore do not themselves require side channels to implement back-pressure.

The blocked( ) function is used in a module to determine if a channel's buffer space is full enough to cause the next send( ) operation to stall. In some implementations, this function can be conservative and allow false positive results. For example, the blocked( ) function will not return false if send( ) could stall, but might return true even when send( ) will not stall. This function can be used as a test before a send( ) operation to avoid program stalls.

The receive( ) function is used in a module with an input port (or i/o port) to read data arriving over a channel connected to that port. A corresponding receive( ) operation executed in a tile stalls if no data is available to be read from a buffer.

The available( ) function is used in a module to determine whether any words are ready to read using the receive( ) function. This function can be used as a test before a receive( ) function to avoid program stalls.

The drain( ) function is called by both the sender and receiver modules connected to a channel. When drain( ) returns, the channel is guaranteed to be empty, and no words can be read using receive( ) until the sender calls send( ).

5.1 Channel Types

The SCU compiler is able to choose from among multiple possible channel types including a shared memory channel, and different types of streaming channels. The ability to select a channel type based on demands of a given application allows each channel to be tailored to better satisfy the demands of the application. High-bandwidth data channels can be mapped to hardware networks that offer high throughput, while data channels used for control commands may require less throughput but more flexible buffering, and can be mapped to a shared memory channel. The SCU compiler can use program statistics, as well as profiling and hinting, to optimize the selection of channel types. Channel types include: a shared memory (SM) channel, a matched dynamic network (mDN) channel, an unmatched dynamic network (uDN) channel, and a static network (SN) channel.

5.1.1 SM Channel

An SM channel is implemented using a first in, first out (FIFO) data structure in memory accessible by the channel's endpoint module(s). For example, the FIFO data structure can include a queue with a range of memory locations for storing words of data, a head pointer, and a tail pointer. In some implementations, the memory locations form a circular buffer and the head and tail pointers wrap around from the one end of the memory range to the other end of the memory range. Access to the memory locations and the head and tail pointer can be protected by a lock, such that the sending module and receiving module each must wait for the other to release the lock before being granted access. An SM channel allows arbitrarily large buffering between a sender and receiver limited only by the amount of memory available for allocation as a shared FIFO data structure.

The instructions that implement the send( ) receive( ) available( ) and blocked( ) functions for an SM channel include an instruction that sets a lock before checking a head or tail pointer or reading or writing the memory range. The lock operation is based on an atomic memory operation, such as test-and-set, that is used to prevent one module or thread from accessing data that is currently in use by another module or thread.

The instructions that implement the drain( ) function for an SM channel include barrier operation. For example, drain( ) can be implemented using a "state" field, initially set to 0 and protected by a lock. The sender module would increment state value from 0 to 1 upon entering the drain( ) function, the receiver module would increment the state value from 1 to 2, and the sender module would then set head equal to tail, reset state back to 0, and exit the drain( ) function. Once the receiver reads a state value of 0, it would also exit drain( ), knowing that the FIFO is now empty.

To implement reverse flow control for an SM channel that uses a circular buffer in the FIFO data structure, the sender can receive reverse flow control information indicating the current values of the head and tail of the queue and the sender may not send more data if the send( ) operation would result in the head and tail pointers crossing.

The shared memory can be allocated within an external memory module coupled to a tile. Alternatively, the shared memory can be allocated in memory within one or more tiles (e.g., a portion of the data memory in a tile). For an SM channel, even though the data is not routed directly from a tile of a sender module to a tile of a receiver module, there still exists a predetermined route along which the data travels from the tile of the sender module to the location of the shared memory, and from the location of the shared memory to the tile of the receiver module.

In some cases, SM channels may have higher latency than streaming channels such as when the data needs to travel over a long route to and from the location of the shared memory. In other cases, such as for modules mapped to the same tile using local memory within the tile to store a shared FIFO data structure, latency is low.

5.1.2 Dynamic Network Channels

The mDN and uDN channel types are streaming channels implemented over the dynamic network. The SCU compiler maps module ports to physical ports of tiles implementing the modules. This physical port assignment determines the route through the dimension-ordered wormhole-routed dynamic network that will be used to transmit data over the channel connecting any given ports. Each data word or group of words is preceded by a header specifying the receiver tile and a "channel tag."

The channel tag is used to disambiguate messages at the receiver module. The receiver module can allocate a dedicated de-multiplexing queue in the receiver tile for a limited number of mDN channels based on the channel tags for those channels. Incoming packets tagged for one of these mDN channels are sorted into a corresponding memory buffer in the tile (e.g., the buffer 1110 of de-multiplexing queue 1104 in FIG. 11 of U.S. application Ser. No. 11/313, 900). Incoming packets tagged for a uDN channel do not correspond to one of the dedicated de-multiplexing queues and are stored in a catch-all queue that includes a memory buffer that receives data for multiple uDN channels (e.g., the buffer 1118 of the catch-all queue 1106 in FIG. 11 of U.S. application Ser. No. 11/313,900). The packets stored in the catch-all queue can be sorted based on channel tags, for example, by triggering an interrupt to prompt the processor to read the packets from this single buffer and sort them into queues in memory, as described in more detail below.

5.1.2.1 mDN Channel

An mDN channel is assigned a dedicated de-multiplexing queue in a tile of the receiving module. The SCU compiler sets up an mDN channel by assigning a channel tag and setting up a side channel from the receiver module to the sender module for reverse flow control information used to stall the sender in the if a buffer for the channel is full. Techniques for implementing reverse flow control for an mDN channel include "acknowledgement-based flow control" and "protection-based flow control."

Acknowledgement-based flow control is based on an implicit agreement between the sender and receiver that the sender cannot send data unless it knows that the receiver has removed enough data from the buffer such that there will be space left in the buffer to store the data to be sent. Thus, the sender receives information that indicates that such space is available. One way to send this information is in the form of an acknowledgement message (or "ACK message") from the receiver to the sender, indicating a number of words read from the channel's buffer (e.g., a dedicated hardware buffer, or buffer space reserved in memory).

In one approach, the receiver can send an acknowledgement packet back after every word of a packet is received. This approach can consume a large amount of network bandwidth since each ACK message represents one or more words of traffic sent over the network. Alternatively, the receiver can send an acknowledgement message after every N words, where N is the size of the buffer. In this case, the sender can send N words and then wait until it gets an ACK message from the receiver. Since the ACK message is sent after each Nth word is received, the sender will stall for at least one round-trip time every N words.

Alternatively, to reduce the bandwidth consumed by ACK messages and avoid stalling for a round-trip time, a "counting acknowledgement" approach uses ACK messages that include a count of the number of words read N) since the last ACK message was sent. Thus, multiple receive( ) operations can be acknowledged with a single ACK message, but the receiver need not wait until it has read a full buffer of data before sending the ACK message. For example, the receiver can send an ACK message after the number of words received is half of the channel buffer size. In this case, the side channel used to send the ACK messages would need to be able to store at least two outstanding ACK messages in its buffer.

The ACK messages can also represent "credits" in a credit based flow control in which each ACK message represents a "future acknowledgement" for sending a word. With credit based flow control, the sender can determine an initial number of data words that can be sent according to the initial number of "credits" sent.

The side channel that carries ACK messages could be implemented, for example, as a mDN channel or uDN channel or as an SM channel. If an mDN channel is used for the side channel, the send( ) function that writes data to a channel checks the de-multiplexing queue allocated for the side channel for ACK messages at least whenever a count of unacknowledged words sent reaches N. Alternatively, if a uDN channel is used for the side channel, an interrupt triggered on receipt of an ACK message can increment a counter that keeps track of ACK messages received. The send( ) function can maintain a separate counter that keeps track of outstanding unacknowledged words sent, and stall when the difference between the two reaches N words.

Protection-based flow control can be used to reduce the communication overhead associated with generating and receiving ACK messages in acknowledgement-based flow control. For applications in which the receiver can read words more quickly than they are being sent, or in which the sender can reasonably stall on a blocked port, the overhead for handling ACK messages may be unjustified.

With protection-based flow control, the sender module is able to send until an interrupt handler monitoring the channel buffer sends a dynamic message indicating that a channel buffer has overflowed into a backup storage (e.g., as in the buffer virtualization scheme described in section 4.2.2 of U.S. application Ser. No. 11/313,900). The temporary overflow condition is resolved by directing the receiver to read enough data to free at least some space in the channel buffer, and another dynamic message is sent to the sender to resume sending data.

Other approaches to protection-based flow control can be used. For example, the receive( ) function can read data from memory external to the tile by default instead of de-multiplexing queue's dedicated buffer within the tile. If no channel data is available in memory, the receive( ) function will check for data in the de-multiplexing queue buffer. If the buffer fills up with data because no receive( ) function has been performed, an interrupt fires and the processor copies the data in the buffer into a virtual buffer in memory. In this approach, interrupts are used to pull data from the de-multiplexing queue buffer into memory when the buffer is full, but the processor does not need to move that data back into the de-multiplexing queue via the refill mechanism.

The virtual channel buffers in external memory can be separate data structures for each channel from which an application reads data using the receive( ) function. Alternatively, data corresponding to multiple channels can be read from a single data structure such as, for example, a linked list of pointers, each of which points to the data received on a corresponding channel.

5.1.2.2 uDN Channel

A uDN channel is not assigned a dedicated de-multiplexing queue. An interrupt is triggered when packets are stored in a catch-all queue to signal the processor to sort the packets based on the channel tags. One reason uDN channels are used is that each tile has a limited number of dedicated de-multiplexing queues with hardware buffers.

The send( ) function for a uDN channel can be implemented in a similar manner to the send( ) function for an mDN channel. The receive( ) function includes instructions for moving data from an interrupt handler into the application space. This cross-domain communication can be handled using a shared memory data structure or by implementing the receive( ) function as an interrupt handler (system call).

A uDN channel can also use a side-channel for communicating reverse flow control information. Because these side channels are set up as part of the channel library functions and not accessible to the application, an interrupt-based side channel can be processed with the knowledge that it will only contain ACK messages. This allows optimization of the mechanism by which receipt notification is given to the module's send( ) function. For example, the interrupt handler triggered when an ACK message is received could increment a "words received" counter. The send( ) function would maintain a separate "words sent" counter and only allow data transmission if the difference between the two is less than the number of buffer words allocated for the channel buffer.

5.1.3 SN Channel

A SN channel is a streaming channel that is mapped to a route of links over the static network that is reserved at compile-time. The SCU compiler generates switch instructions to set up a route of static network links that start at a tile of the sender module and end at a tile of the receiver module. An SN channel enables low send-to-receive latency. At runtime, the send( ) function simply writes data words to the designated static network output port, and the receive( ) function simply reads data out of the designated static network input port. In some cases, the SCU compiler generates permanent switch instructions that do not change over the life of the application and therefore does not need to coordinate schedule changes to switch instructions for static network switches of different tiles. In other cases, the SCU compiler generates switch instructions according to a schedule that enables the static network links to be shared by multiple channels. Reverse flow control for static network links can be implemented as described above in section 2.1.

5.2 Avoiding Deadlock

The channel library provides tools to help a programmer avoid network deadlock. We define network deadlock is a condition in which the application ceases to make forward progress while some of its module are stalled on a send( ) or receive( ) operation. Network deadlock includes "protocol deadlock" and "resource induced deadlock."

Protocol deadlocks can occur because of programmer errors that lead to a read( ) operation that will never receive any data. For example, a set of modules in a graph connected by channels in a cycle may all be waiting on each other for data from one of the channel edges in the cycle or to perform some action. For example, protocol deadlock may occur if a first module is waiting for a shared memory lock held by a second module before proceeding, and the second module is waiting for data to arrive from the first module before releasing the lock.

Resource induced deadlock occur due to lack of adequate space in one or more channel buffers to allow each send( ) operation to complete. Since delivery in the static and dynamic networks interconnecting the tiles is guaranteed, data words or packets are not simply discarded or retransmitted if send( ) fails as in, for example, in TCP/IP networks.

The channel library implements the send( ) and receive( ) functions to be free from resource induced deadlocks if the programmer specifies the minimal amount of buffering needed in each channel to avoid resource induced deadlock. The programmer need not worry about the buffering provided in hardware, buffer allocation in memory, or virtualizing (providing memory space for) channels that require more buffering than is provided in the hardware networks, since these mechanisms are handled by the SCU compiler implementation of channel library functions.

When writing a module program, the programmer can document the buffering requirements at a module's external interfaces, along with any inter-channel relationships. Certain functions, such as drain( ) are provided by the channel library to simplify the process of designing and documenting inter-module protocols.

5.3 Selecting Channel Types

An application may contain multiple modules with many channels connecting them. The SCU compiler and the runtime system cooperatively implement a set of channels in a way that provides high performance while avoiding resource induced deadlock. A selection procedure for selecting a channel type for each channel defined in an elaboration script aims to provide high performance by allocating high-bandwidth and/or low-latency channel types to performance-critical channels.

There are various criteria used by the SCU compiler to select a channel type for implementing a given channel. The programmer can specify required or desired characteristics for a channel such as buffer size, bandwidth, or latency. The SCU compiler selects channel types that will satisfy the specified characteristics for each of the specified channels.

A SN channel allows low message latency and high effective bandwidth since header generation or reverse flow control instructions are not needed. However, SN channels provide smaller amounts of channel buffering. If a channel requires more buffering, or SN channel is not available due to resource constraints, an mDN channel type is selected, which allows larger buffer sizes at the cost of slightly higher latency and lower effective bandwidth. If a module runs out of dedicated de-multiplexing queues for receiving mDN channel data, the remaining channels can be implemented as uDN channels, which have relatively high latency, though typically lower than that of SM channels. Channels with large buffering requirements can be implemented as SM channels. The latency on such channels may be high, but are typically lower than that of dynamic network channels when a very large channel buffer is required.

An exemplary preference order for selecting the channel type of a given channel defined in an elaboration script is as follows. Channels with large buffering requirements are implemented SM channels. If possible, channels requiring small buffers are implemented using SN channels. The channels remaining after those assignments are implemented as mDN channels, then as uDN channels.

The SCU compiler also determines a priority order for assigning types to the channels in a given elaboration script. High priority is given to high-bandwidth channels and channels that are used in tight feedback loops. In some cases, the SCU compiler can use statistical information about channel usage to determine which channels meet these criteria. For example, pointer analysis can be used to determine which send( ) operations use which channels. The SCU compiler can identify channels that are used frequently or in loops with potentially large iteration counts. Alternatively, profiling tools could be used to gather runtime statistics, or user hinting provided at elaboration time could predetermine the choice of channel implementations.

Once compiler analysis, profiling, and user hinting have determined an order of priority for the channels, the channels types can be selected using a greedy algorithm. Other channel type selection algorithms can consider the effects of long-distance routes on resource usage or can combine channel type selection with module placement onto tiles.

Various features of the tiled integrated circuit architecture described herein can be implemented by modifying versions of the tiled integrated circuits described in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

It is to be understood that the foregoing description is intended to illustrate and not to limit the scope of the invention, which is defined by the scope of the appended claims. Other embodiments are within the scope of the following claims.

What is claimed is:

1. A method comprising:
accepting by a computer, a program specification that defines a plurality of processing modules and a specification of channels as input, output and i/o ports of the modules of the program specification;
compiling the program specification, by a multi-phase compiler executing in the computer by:
compiling in a first phase of execution of the multi-phase compiler, high level source code of the processing modules to generate module programs, with the first phase parsing the high-level source code, and performing syntax and type-checking on the high level source code of the processing modules to generate the module programs; and
compiling in a second phase, the module programs into an executable program by mapping at least a portion the module programs to run on processing engines of a multi-core processor of plural processing engines according to separate elaboration scripts for each module, the elaboration scripts specifying mapping of the module programs to specific processing engines, define types and channel assignments for the processing engines, with the channel assignments connecting the mapped module programs for execution on the processing engines, and the defined channel types use a channel library that includes functions for different channel types to implement the channels.

2. The method of claim 1, wherein the elaboration script defines the channels and ports between ports defined by the module programs, with the statically compiler unit compiler performing the mapping.

3. The method of claim 1, wherein the elaboration script defines an application as a graph of interconnected modules and the elaboration script includes a specification of the mapping of module programs to processing engines.

4. The method of claim 3, wherein module ports that are not connected to a channel provide an external input or output interface for the executable program.

5. The method of claim 4, wherein external interface ports of one executable program can be connected to external interface ports of another executable program at execution time using dynamically assigned channels.

6. The method of claim 1, wherein one or more elements of one or more processing engines in the network assigned to a channel include one or more of:
switches of processing engines along a route through the network between processing engines of respective processing modules; and
ports of processing engines coupled to data paths between processing engines along a route through the network between processing engines of respective processing modules.

7. The method of claim 1, further comprising:
accessing a channel library that includes functions for different types of channels specified in the elaboration script.

8. The method of claim 7, wherein the second phase of compiling, the compiler determines resources to be used to implement each channel depending on the type of channel defined in the elaboration script.

9. The method of claim 1, wherein the second phase maps during runtime.

10. The method of claim 1, further comprising, for each of at least some of the channels, selecting memory resources for providing a buffer for storing data associated with the channel.

11. The method of claim 10, further comprising a multi-processor programming library, accessible by the computer, and which provides an application program interface for sets of tasks including at least one of channel communication, dynamic messaging, threading, shared memory, and management of the executable program, with the management of the executable program including management functions that enable the set of currently executing programs and channels to be modified at runtime.

12. The method of claim 11, wherein channels define communication paths between modules with the channels providing pipes over which a module can send data with characteristics of the channel defined with the elaboration script, the channels can be single cast or multicast communication paths among modules.

13. The method of claim 12, wherein a portion of the channels are mapped at compile-time in the first phase of compiling.

14. The method of claim 12, wherein a portion of the channels are mapped at run-time in the second phase of compiling.

15. The method of claim 12, wherein the information for the destination processing engine comprises identifiers to distinguish data associated with a first channel from data associated with a second channel.

16. The method of claim 15, wherein the identifiers comprise a tag for the first channel for matching received data to a buffer associated with the first channel, and a tag for the second channel for matching received data to a buffer associated with the second channel.

17. The method of claim 16, wherein the processing engines match a tag in an incoming packet to a buffer dedicated to storing data associated with the channel identified by the tag.

18. The method of claim 1, further comprising:
mapping, at least one channel between a port of a first processing module and a port of a second processing module, to a queue stored in shared memory accessible to a processing engine of the first processing module and a processing engine of the second processing module.

19. The method of claim 18, further comprising allocating space for storing the queue in the shared memory according to a minimum buffer size indicated in the program specification.

20. The method of claim 1, further comprising:
selecting for a channel mapped to a route between a first processing engine and a second processing engine, memory resources for providing a buffer for storing data arriving at the second processing engine.

21. The method of claim 20, further comprising selecting memory resources for providing a buffer for storing acknowledgement information arriving at the first processing engine from the second processing engine.

22. A computer program product embodied on a computer-readable memory device, for compiling a program to generate instructions to be executed in a multi-core processor of interconnected processing engines, the computer program comprising instructions for causing a computer system to:

accept a program specification that defines a plurality of processing modules and a specification of channels as input, output and i/o ports of the modules of the program specification;

compile in a first phase high level source code of the processing modules to generate module programs, with the first phase parsing the high-level source code, and performing syntax and type-checking on the high level source code of the processing modules to generate the module programs; and compile in a second phase, the module programs to produce an executable program by mapping at least a portion the module programs to run on a set of one or more processing engines of the interconnected processing engines according to separate elaboration scripts for each module, the elaboration scripts specifying mapping of the module programs to specific processing engines, define types and channel assignments for the processing engines, with the channel assignments for connecting the mapped module programs for execution on the processing engines, and the defined channel types using a channel library that includes functions for different types of channel to implement the channels.

23. A system comprises:

a processor device;

memory coupled to the processor device, a computer-readable hardware storage device storing a computer program product for generating instructions to be executed in a multi core processor of interconnected processing engines, the computer program comprising instructions for causing the system to:

accept a program specification that defines a plurality of processing modules and a specification of channels as input, output and i/o ports of the modules of the program specification;

compile in a first phase high level source code of the processing modules to generate module programs, with the first phase parsing the high-level source code, and performing syntax and type-checking on the high level source code of the processing modules to generate the module programs and channels; and compile in a second phase the module programs into an executable program by mapping at least a portion the module programs to run on a set of one or more processing engines of the interconnected processing engines according to a separate elaboration script, the elaboration script specifying mapping of the module programs to specific processing engines, defines types and channel assignments for the processing engines, and with the channel assignments for connecting the mapped module programs for execution on the processing engines and the defined channel types use a channel library that includes functions for different types of channels, to implement the channels.

* * * * *